(12) United States Patent
Khan et al.

(10) Patent No.: US 10,877,911 B1
(45) Date of Patent: Dec. 29, 2020

(54) PATTERN GENERATION USING A DIRECT MEMORY ACCESS ENGINE

(71) Applicant: Amazon Technologies, Inc., Seattle, WA (US)

(72) Inventors: Asif Khan, Cedar Park, TX (US); Kiran Kalkunte Seshadri, Cedar Park, TX (US); Thomas A. Volpe, Austin, TX (US); Carlos Javier Cabral, Leander, TX (US); Steven Scott Larson, Georgetown, TX (US)

(73) Assignee: Amazon Technologies, Inc., Seattle, WA (US)

( * ) Notice: Subject to any disclaimer, the term of this patent is extended or adjusted under 35 U.S.C. 154(b) by 706 days.

(21) Appl. No.: 15/085,028

(22) Filed: Mar. 30, 2016

(51) Int. Cl.
*G06F 13/28* (2006.01)

(52) U.S. Cl.
CPC .......... *G06F 13/28* (2013.01); *G06F 2213/28* (2013.01); *G06F 2213/2802* (2013.01)

(58) Field of Classification Search
USPC ...................................... 710/22, 308, 23, 26
See application file for complete search history.

(56) References Cited

U.S. PATENT DOCUMENTS

| | | | | |
|---|---|---|---|---|
| 5,551,001 A * | 8/1996 | Cohen | ................. | G06F 12/0848 711/122 |
| 6,453,365 B1 * | 9/2002 | Habot | ..................... | G06F 13/28 710/22 |
| 6,792,506 B2 * | 9/2004 | Solomon | ............... | G06F 3/0613 710/22 |
| 6,889,266 B1 * | 5/2005 | Stadler | .................... | G06F 13/28 707/999.01 |
| 9,239,796 B2 * | 1/2016 | Radu | ....................... | G06F 13/28 |
| 2004/0062267 A1 * | 4/2004 | Minami | .............. | H04L 12/5693 370/463 |
| 2004/0193808 A1 * | 9/2004 | Spencer | ............. | G06F 12/0802 711/142 |
| 2007/0109153 A1 * | 5/2007 | Ma | ...................... | H03M 7/3086 341/50 |
| 2007/0113171 A1 * | 5/2007 | Behrens | .............. | G06F 15/7842 715/239 |
| 2008/0005386 A1 * | 1/2008 | Matsuda | ................. | G06F 13/28 710/22 |
| 2008/0126612 A1 * | 5/2008 | Barrow | ................... | G06F 13/28 710/34 |
| 2012/0094637 A1 * | 4/2012 | Jeyaseelan | .............. | H04W 4/12 455/412.2 |

(Continued)

*Primary Examiner* — Farley Abad
*Assistant Examiner* — Henry W Yu
(74) *Attorney, Agent, or Firm* — Kilpatrick Townsend & Stockton LLP

(57) ABSTRACT

Disclosed herein are techniques associated with a Direct Memory Access (DMA) engine that can include a data generation module. The DMA engine can receive, from a processing entity, a particular type of write command with an indicator to write a data pattern to an address. Upon receipt of the particular type of write command, the DMA engine can generate, using a data generation module of the DMA engine, the data pattern to be written to the address. The processing entity can be Central Processing Unit (CPU) including a core configured to process serial commands. The DMA engine can be disposed on a same die as a processing entity or a network interface port.

25 Claims, 9 Drawing Sheets

(56) References Cited

U.S. PATENT DOCUMENTS

| | | | |
|---|---|---|---|
| 2014/0215103 A1* | 7/2014 | Cohen | G06F 13/28 |
| | | | 710/23 |
| 2015/0081726 A1* | 3/2015 | Izenberg | H04L 47/2433 |
| | | | 707/755 |
| 2016/0292100 A1* | 10/2016 | Olcay | G06F 13/28 |
| 2017/0091114 A1* | 3/2017 | Gold | G06F 11/1072 |

* cited by examiner

PATTERN GENERATION USING A DIRECT MEMORY ACCESS ENGINE

BACKGROUND

Direct Memory Access (DMA) engines are used as off-loading devices to alleviate processing logic from tasks associated with memory transfers. A DMA engine can be thought of as a coprocessor configured to perform tasks associated with memory transfers. DMA engines can generally be associated with a processor wherein the processor commands an associated DMA engine to perform memory transfers in accordance with commands exchanged between a DMA engine and an associated processor. These commands can include memory locations, memory payloads, or other information associated with a specific memory transfer. By performing these memory transfer functions, the DMA engine can alleviate an associated processor from overhead associated with these functions. However, transferring large amounts of data using a DMA engine can still become a processor intensive task because the processor may need to supply the DMA engine with information necessary to perform the large amounts of memory operations, leading to increased bus, processor, and power usage. Thus, there is need for improvement in the field of DMA engines.

BRIEF DESCRIPTION OF THE DRAWINGS

Various embodiments in accordance with the present disclosure will be described with reference to the drawings, in which.

DETAILED DESCRIPTION

Figure 1:
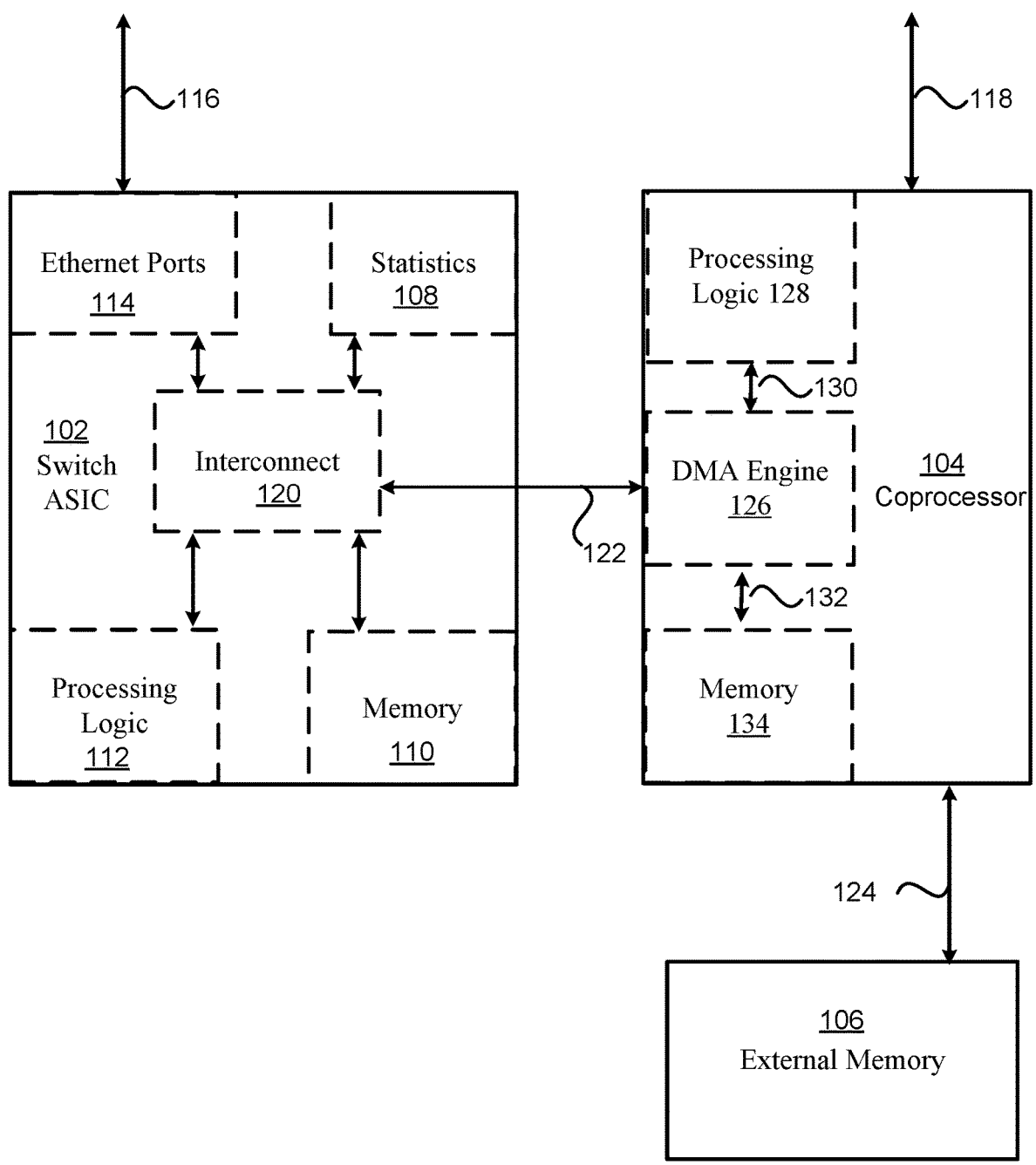
FIG. 1 illustrates a networking device including a DMA engine that can include features of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A DMA engine can take various forms depending upon its implementation and purpose. For example, a DMA engine can be tailored for the needs of an associated graphics processing unit, a central processing unit, cryptography engine, storage unit, interface unit, or other processing entity. Regardless of the implementation of the DMA engine and the associated processing entity, DMA engines can operate to perform memory transfer operations by command from the associated processing entity as well as being provided data for the memory transfer by the processing entity. Although DMA engines can alleviate associated processing entities from many tasks associated with memory transfers, there are still instances where processing entity utilization and utilization of a processing entity interface to the DMA engine can become unnecessarily excessive.

For example, a DMA engine can be associated with a processing entity configured to populate memory containing data tables or other relatively large partitions of data that may need to be initiated to a set data pattern (all zeros, for example). This initialization can be used to populate the memory so that it is in a known state. Disclosed herein are techniques for implementing a data generation module within a DMA engine. The data generation module can allow a DMA engine to generate data to populate a memory address without being provided the data (or the entirety of the data) by an associated processing entity. The use of the data generation module can mitigate the use of an associated processing entity's resources including processing cores, memory, and/or interfaces to transfer or generate data for the DMA to transfer and reduce latencies associated with populating relatively large data sets.

Techniques described herein pertain to a DMA engine that can include a data generation module. The data generation module can be configured to generate data that can be written to a memory address by the DMA engine without the data being provided by an associated processing entity or read from an associated memory location. The DMA engine can also include a parsing module. Using the parsing module, the DMA engine can parse and accept specific commands to populate one or more and memory addresses using the data generation module. The DMA engine can be configured to generate a prespecified data pattern or a data pattern derived using data provided to the DMA engine. Because the DMA engine can generate data independently of the processing entity, the processing entity need not provide data to the DMA engine or may need not provide as much data. In other words, the processing entity can be alleviated from the task of generating, storing, and/or transferring data to be provided to the DMA engine. Additionally, the DMA engine can be alleviated from the task of reading the data from the processing entity or other locations.

The resources of a processing entity required to generate data and the associated data bus utilization can become significant as the amount of data being transferred via a DMA engine increases. One example use case that can require significant processing entity resource utilization can be a DMA engine used with a networking device. A networking device can be configured to route network data and/or direct network traffic for multiple networking devices. As one example, a singular networking device can operate hundreds (or more) network interconnects. Such networking devices can also comprise multiple data tables and/or memory banks associated with networking data transferred between various other networking devices. The data tables can be used to improve the performance of the networking device by allowing the networking device (or other computer devices) to efficiently route networking data that is transferred via the networking device. The data tables can include information associated with the destination, origination, path length, latency or other information associated with a received network packet. As the size and complexity of such networking devices increases, so can the size requirements for associated data tables.

Many additional devices also use relatively large data tables and memory pools. For example, data tables can be used in high-performance computing environments commonly used to model weather patterns and other phenomena, geographic routing servers for optimizing the routing of vehicles, market analysis computing devices, and many other software, hardware, and firmware devices. In many devices, it is desirable to initialize memory or data structures stored within memory so that they are in a known state (such as before they are populated). For example, memory can be initialized upon a boot procedure such as when a device is powered on. Such an initialization procedure, when using a DMA engine without a data generation module, can become relatively time consuming and require a relatively large amount of system resources to, for example, continually provide the DMA engine with data for the initialization procedure. In other words, the data may be generated by a processing entity and then either stored internally or transferred to an external memory location prior to access by a DMA engine. Additionally, the transfer of initialization data from a processing entity to an external memory location, from a processing entity to the DMA engine, and/or from memory to the DMA engine can utilize data bus resources. The use of processing entity and data bus resources can consume relatively large amounts of power and prevent the use of these resources or buses for other purposes.

Using techniques of this disclosure, a DMA engine can be configured to generate data independently from processing logic, reducing the number of commands and resource utilization needed to write data patterns to memory, initialize memory, or for other purposes. As one example, a specific command received by a DMA engine can configure the DMA engine to populate one or more memory locations with '0' bits. Alternatively, the DMA engine can generate and transmit any data pattern associated with a specific command. For example, the DMA engine can generate a pattern of all '1' bits, can receive a seed for generating a more complex pattern, can generate a specific pattern tied to a specific command, or can generate other patterns. Using techniques of this disclosure, a DMA engine and an associated computer system can operate more efficiently when populating memory, especially for implementations that require relatively large data sets in memory to be initialized or otherwise populated.

FIG. 1 illustrates an implementation of a networking device 100, which can be a network switch, for example. The networking device can include a Switch Application Specific Integrated Circuit (ASIC) 102, a coprocessor 104, and/or external memory 106. Although Switch ASIC 102, coprocessor 104, and external memory 106 are illustrated as being separate entities, they can be physically disposed on a singular die and in any combination (e.g., the coprocessor 104 and Switch ASIC 102 can be disposed on a singular die). The Switch ASIC 102 can be configured to interface 116 with a plurality of differing networking devices (not shown). For example, the Switch ASIC 102 can interface with personal computers, network switches, network hubs, mobile devices, or other networking devices. Switch ASIC 102 can include one or more Ethernet Ports 114 to enable network communications with the networking devices (not shown). The Ethernet Ports 114 can enable network communications using Transmission Control Protocol/Internet Protocol (TCP/IP), Domain Name System (DNS), Hypertext Transfer Protocol (HTTP), Dynamic Host Configuration Protocol (DHCP) or other protocols. The Ethernet Ports 114 can also implement various speeds and methods of transmission such as 100 Gigabit (G), 10G, 1G, wired or wireless transmissions. Switch ASIC 102 can also include a Statistics block 108, a memory 110, and/or a processing logic 112.

Statistics block 108 can include logic and/or memory to ascertain and/or log statistics related to the functioning of Switch ASIC 102. For example, statistics block 108 can include one or more counters or counter tables to record various information concerning events associated with Switch ASIC 102. For example, statistics block 108 can include entries for recording statistics concerning routing table entries, ACL entry hit counters, or various other counters that may or may not be associated with networking tasks. Statistics block 108 can also include logic to update counters or counter tables stored within memory 110. Statistics block 108 can include memory or access memory 110. Memory 110 can be shared by various blocks of Switch ASIC 102. Memory 110 and/or memory stored within statistics block 108 can be static Random Access Memory (RAM), dynamic RAM, double date rate RAM, flip-flops, or other types of memory to store data.

Switch ASIC 102 can also include processing logic 112 that can include logic gates, memory, processing cores, or other elements. Processing logic 112 can include a processor core such as an x86 or ARM® compatible processor core, for example, and/or can implement one or more fixed function units, Field Programmable Gate Arrays (FPGA), or other functional units. Various interconnects such as interconnect 120 can be used to pass information between the various blocks of Switch ASIC 102. The interconnects (such as interconnect 120) can include point to point interconnect(s), common bus(es), or combinations thereof.

Coprocessor 104 can include a processor core such as an x86 or ARM® compatible processor core, for example, and/or can implement one or more fixed function units, Field Programmable Gate Array (FPGA), or the like. Coprocessor 104 can implement various functionalities associated with networking device 100. For example, Coprocessor 104 can be used to execute software that may or may not be stored in memory, such as external memory 106 and/or onboard memory (not shown). Coprocessor 104 can communicate with Switch ASIC 102 via interface 122. Interface 122 can include a Peripheral Component Interconnect (PCI), Serial Peripheral Interface (SPI), Universal Serial Bus (USB), a parallel interface, or various other topologies. Interface 124 between Coprocessor 104 and External memory 106 can similarly be configured with similar topologies.

Coprocessor 104, Processing Logic 112, Memory 110, External Memory 106, and/or Statistics block 108 can be used to implement a control plane for networking device 100. A control plane, as used herein, can be a functional representation of a networking device that concerns routing or control of network packets. In other words, a control plane can be used to orchestrate the movement of data packets through a networking device or through a network comprising multiple devices. Ethernet Ports 114 (and/or Coprocessor 104, Processing Logic 112, Memory 110, External Memory 106) can be used to implement a data plane for networking device 100. A data plane, as used herein, can be a functional representation of a networking device concerning carrying/movement of data packets. In other words, the control plane directs the traffic through a network or networking device while the data plane performs the actual movement of the data. If a data plane is correlated to a bus, the control plane can be correlated to a bus driver.

Statistics block 108 can aid in the functioning of the control plane by collecting statistics concerning packets as they move through networking device 100. For example, a routing table of the Statistics block 108 can be used to indicate the distance between networking device 100 and particular network destinations, as the network is currently configured. As the network topology changes, the routing table can be updated accordingly to reflect these changes. The routing table can be used by the networking device 100 to optimize prioritization of the transfer of data packets along with, for example, Quality of Service (QOS) or other optimizations. An Access Control List (ACL) can be a list of permissions that can further enable certain port numbers and/or IP addresses to be available. The ACL and/or the forwarding table can each be associated with a counter table to temporarily or otherwise store statistical information concerning the access of certain nodes and/or devices that networking device 100 interfaces to, for example. Although, only the ACL and the forwarding table are used here as an example, it should be understood that various other functions (even outside of a networking device) can be associated with and/or use the functionality of a data table or similar memory construct. As one such example, a device cache can use a data table to increment cache hits and/or misses. As such, this disclosure is not limited to a data table for use with only a networking device such as networking device 100, but can be used in a wide variety of devices for a wide variety of purposes. Many data tables and other memory constructs can benefit from the disclosure herein, especially if large amounts of data need be populated by a DMA engine.

Coprocessor 104 can also include processing logic 128, DMA engine 126, memory 134, and interconnects 130 and 132. DMA engine 126 can be configured to alleviate coprocessor 104 of some or all duties related to transfer of memory between coprocessor 104 and Switch ASIC 102. For example, processing logic 128 can direct DMA engine 126 to populate memory locations of statistics block 108 or memory 110 through the use of interface 122 and interconnect 120 using commands provided by processing logic 128 via interconnect 130 or obtained from memory 134 via interface 132 or external memory 106 via interface 124. Alternatively, DMA engine 126 can be configured to read data from Switch ASIC 102, or any other address. Memory read from Switch ASIC 102 can be written to memory 134, external memory 106, registers or cache of coprocessor 104 (not shown), or other addresses. Networking device 100 can be configured to initialize memory of Switch ASIC 102 upon power up, or upon a specific command received via interface 118, for example.

As described herein, data tables stored within Switch ASIC 102 can be relatively large and therefore require multiple write operations from DMA engine 126 for initialization. As such, interface 122 and interconnect 120 can be inundated by large amounts of data associated with the initialization of such data tables. Additionally, coprocessor 104 can also require a relatively large number of processing cycles to generate commands and data for the population of data tables or other memory constructs of Switch ASIC 102.

Figure 2:
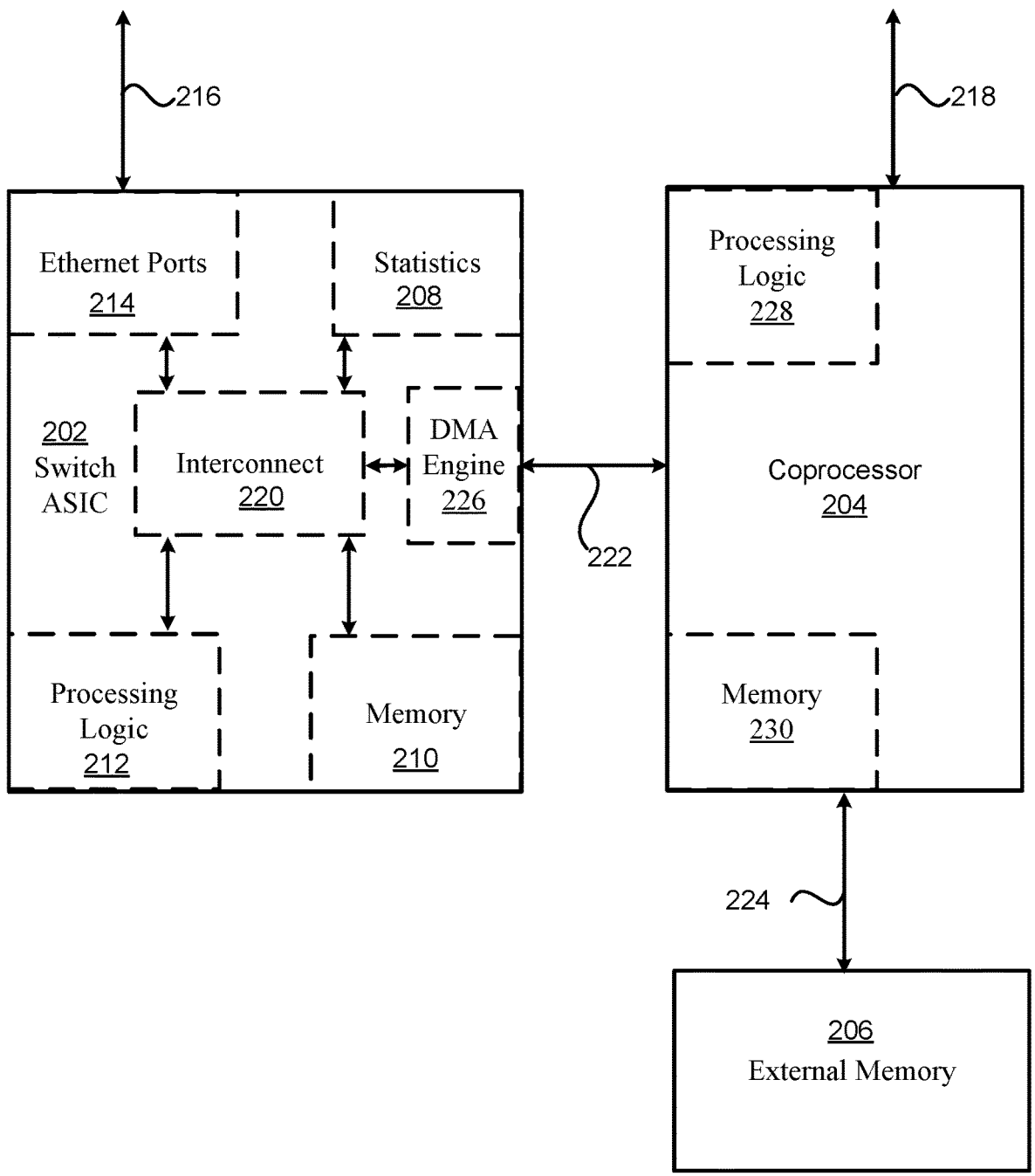
FIG. 2 illustrates a different networking device from the networking device of FIG. 1 including a DMA engine that can include features of the disclosure.

FIG. 2 illustrates a networking device 200. Networking device 200 is similar in function and operation to networking device 100 of FIG. 1. Networking device 200 includes a Switch ASIC 202 and a coprocessor 204. Switch ASIC 202 and its internal components can be similar in operation to Switch ASIC 102. However, Switch ASIC 202 includes a DMA engine 226 which is not included in Switch ASIC 102. Therefore Switch ASIC 202 has additional functionality as compared to Switch ASIC 102. DMA engine 226 can operate similar to DMA engine 126. However DMA engine 226 can be implemented within and provide DMA functionality to Switch ASIC 202. DMA engine 226 can be used in conjunction with processing logic 212 of Switch ASIC 202 and/or processing logic 228 of coprocessor 204. That is to say, DMA engine 226 can accept read and/or write commands from either processing logic 212, from processing logic 228, or from other processing logic blocks (not shown) or memory locations. FIG. 2 illustrates the flexibility of the apparatuses and methods disclosed herein to improve the functionality of DMA engines such as DMA engine 226 or DMA engine 126.

DMA engine 226 can be used to effectuate memory read or write commands for Switch ASIC 202. As one example, DMA engine 226 can read or write commands from memory 210, statistics block 208, ethernet ports 214, or processing logic 212 via interconnect 220. Interconnect 220 can be a ring bus, a common bus, a point-to-point bus, or any other bus. It should be understood that although DMA engine 226 is illustrated as being one component of Switch ASIC 202, a DMA engine can be associated with any or each of the functional block of Switch ASIC 202. Additionally, each of the DMA engines may or may not implement the methods and apparatuses disclosed herein. DMA engines using the techniques described herein can be used with DMA engines that do not use the techniques described herein.

Using a DMA engine with a data generation module disclosed herein, the utilization of functional blocks of Switch ASIC 202 or coprocessor 204 can be alleviated. As one example, DMA engine 226 can be configured to read commands from memory 210 to, for example, write to counter tables contained within memory of statistics block 208. These commands within memory can be populated by processing logic 228 or processing logic 212, for example. If DMA engine 226 does not contain a data generation module, then memory 210 may also need to be populated with the data to be written to statistics block 208 for this example. The data can be provided via processing logic 228 via interconnect 222 or via processing logic 212 via data interconnect 220. As such, processing logic 212 and processing logic 228 processing cycles may be consumed to generate this data. Additionally interconnect 220 and interconnect 222 may be congested with the data transferred between the corresponding processing logic and memory 210. Additionally, DMA engine 226 may also saturate interconnect 222 as it reads the data from memory 210.

However, if a DMA engine utilizes techniques of this disclosure related to the integration of a data generation module within DMA engine 226, resources and usage of corresponding processing logic blocks and interfaces can be alleviated. Using the above example, for example, memory 210 may need not be utilized to store data to populate data tables of statistics block 208. Instead, either processing logic 212 or processing logic 228 can transmit a specific command to memory 210 or directly to DMA engine 226. The specific command can be read by DMA engine 226 from memory 210, for example, and DMA engine 226 can configure itself accordingly to generate data using its associated data generation module (not shown). If DMA engine 226 includes a data generation module to generate data for the population of statistics block 208, for example, then the data no longer need be read from memory 210 and can instead be transmitted directly from DMA engine 226 to statistics block 208 using interconnect 220, for example. The above example gives just one use case of DMA engine 226 including a data generation module. It should be understood that DMA engine 226 can receive commands from various internal or external memory locations and/or functional blocks. DMA engine 226 can also transmit and/or receive data from various other internal or external memory or functional blocks.

DMA Engine 226 can be configured to populate forwarding tables, lookup tables, or other such memory constructs of Switch ASIC 202 (that can be stored in memory 210, for example). For example, one or more commands can be stored within memory 210 or memory 230. DMA engine 226 can read these one or more commands which can command DMA engine 226 to generate data for populating the forwarding tables, lookup tables, or other memory constructs. The DMA engine can be configured to write to memory protected by ECC codes. When the memory is written by the DMA, the ECC code value is computed by logic associated with the memory and the ECC code value is stored in the memory along with the data written by the DMA. When the memory is read, the ECC code value is used to detect and/or correct errors of data stored within the memory. Alternatively, the DMA engine can be configured to write to a memory that is protected by parity. When the memory is written by the DMA, the parity value is computed by logic associated with the memory and the parity value is stored in the memory along with the data written by the DMA. When the memory is read, the parity value can be used by parity checking logic associated with the memory to detect if a value stored within the memory has an invalid value (by detecting an invalid parity value of the data.

As a further example, processing logic 228 can generate the one or more commands for DMA engine 226. When Switch ASIC 202 is powered, DMA engine 226 can retrieve the one or more commands and proceed to initialize or otherwise populate memory of Switch ASIC 202, so that the parity values and ECC code values may be properly computed for all memory entries, for example. A Control/Status Register (CSR) of DMA engine 226 can be set by processing logic 228, for example to indicate that memory is populated with the one or more commands for DMA engine 226 to retrieve. In this manner, Processing Logic 228 can generate a list of commands for DMA engine 226 to follow upon powering Switch ASIC 202 in order to populate memory of Switch ASIC, thus reducing latency for initialization of Switch ASIC 202 and reducing associated resource overhead for initialization.

Figure 3:
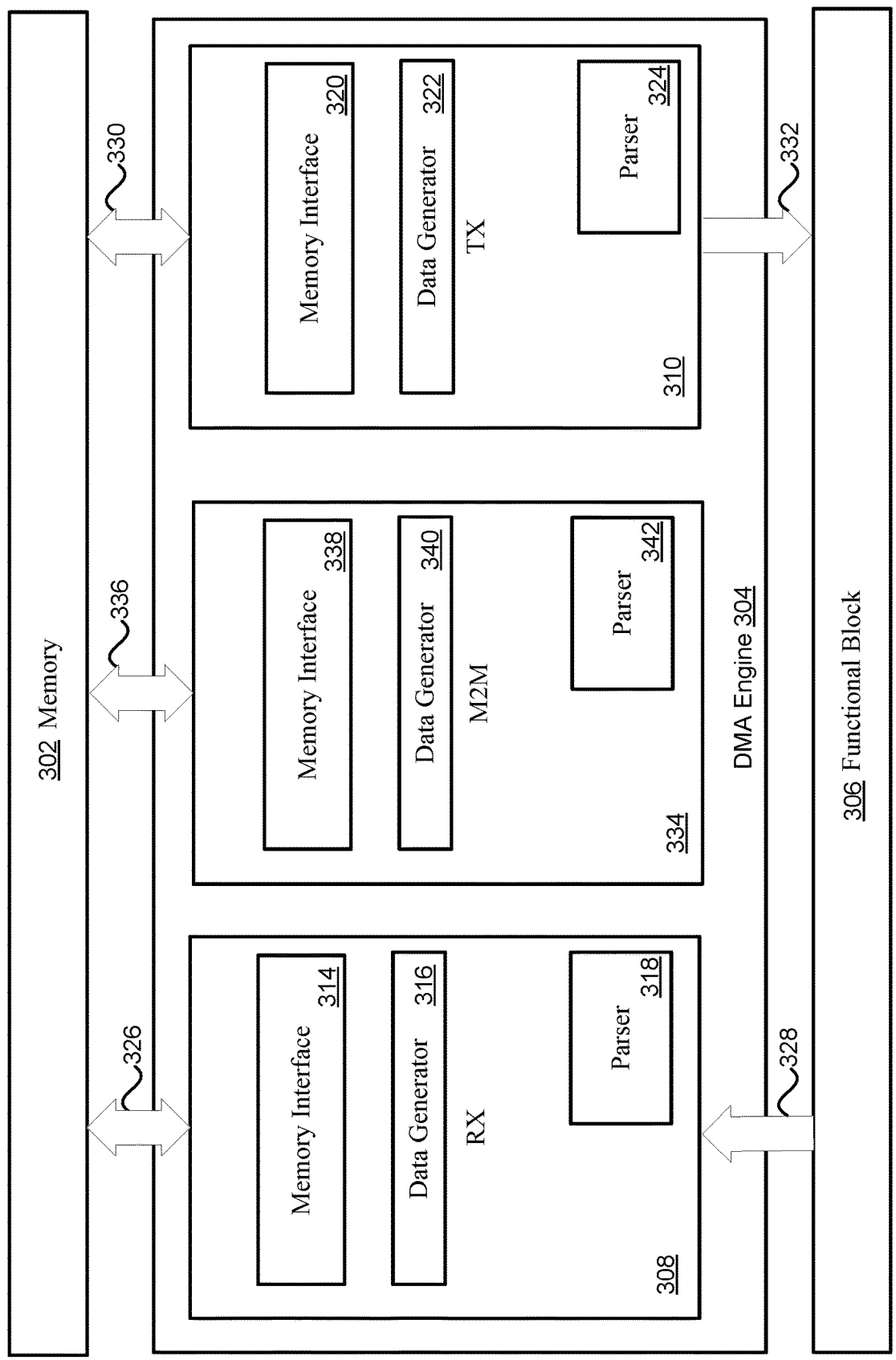
FIG. 3 illustrates a DMA engine that can include features of the disclosure.

FIG. 3 illustrates a DMA engine 300 including example features of the disclosure. FIG. 3 illustrates modes of operation of DMA engine 300 that can be implemented with independent or shared resources of the DMA engine 300. The two modes of operation illustrated are receive 308 (RX) and transmit 310 (TX). As used herein, memory can be capacitive, magnetic, inductive, charge based, optical, or utilize various other technologies to implement storage functions of static or dynamic memory of primary memory, secondary memory, registers, caches, buffers, or other memory structures. In this context, the modes 308 and 310 of operation of DMA engine 300 can be thought of as indicating two directions of data transfer between a functional block and a memory device. As one further example, memory 302 can be primary memory of a device and functional block 306 can be processing logic of a device. The processing logic can comprise memory in the form of flip-flops to implement registers or can implement a transceiver that transmits data to or from DMA engine 304. In such an implementation, functional block 306 can provide command descriptors and or buffer descriptors to DMA engine 304. As one example, functional block 306 can transmit a particular command descriptor to DMA engine 304 via interface 328. When received by DMA engine 304, the command descriptor can be parsed by parser 318. The particular command can indicate to the DMA engine 304 that data is to be generated via data generator 316. As disclosed herein, data generator 316 can then generate a pattern of data. Additionally, parser can obtain address and/or length information from the particular command. The address information can indicate to DMA engine 304 where to write the data pattern generated by data generator 316. The length information parsed from the command can indicate to DMA engine 304 the amount of data to generate via data generator 316 and/or the amount of data to be written to at the particular memory address. Subsequently, DMA engine 304 can include memory interface 314. Upon receiving the particular command, DMA engine 304 can configure memory interface 314 to transfer the amount of data parsed from the particular command (and subsequently generated by data generator 316) to a memory address parsed from the particular message.

As another example, the particular command may not necessarily contain a length field. In this example, parser 318 could extract a particular command and a particular address from a message received from functional block 306, for example. In this example, the command would inherently direct DMA engine 304 to generate a data pattern of a defined length using data generator 316. Additionally memory interface 314 could be configured by DMA engine 304 to transmit a data pattern generated by data generator 316 to an address indicated by the message and extracted by the parser 318.

As yet another example, the particular commands for DMA engine 304 need not be received from functional block 306. For example, DMA engine 304 can be configured to read commands stored in memory, such as memory of functional block 306. In this example, functional block 306 can be a device comprising memory that is populated by a separate processing entity (not illustrated). In this example, DMA engine 304 can independently read commands to write to or read from memory without being directly interfaced to the processing logic. In other words, functional block 306 can act as an intermediary to provide commands to DMA engine 304 from a separate entity. As one example, networking device 200 of FIG. 2 can implement such a system to reduce the complexity of Switch ASIC 202, for example.

DMA engine 304 can also operate in a memory to memory (M2M) transfer mode 334 having a parser 342, data generator 340, and memory interface 338 that can have features of corresponding modules of the receive 308 and transfer 310 modes of operation (or can share components). While operating in the M2M transfer mode 334, DMA engine 304 can read commands from memory 302 and correspondingly transfer data to and from memory addresses of memory 302. Additionally, the M2M transfer mode 334 can utilize data generator module 340 to generate one or more data patterns in response to reading certain commands or types of commands from memory 302. For example, memory 302 may have a series of commands stored therein and DMA engine 304 can read the series of commands to generate and/or move data to various addresses of memory 302 (or other memory modules).

Transmit mode 310 of DMA engine 304 can be implemented in a similar manner and include similar features as described for receive mode 308. Parser 324 can share similar logic as parser 318 or can be the same logical block. Additionally, data generator 322 can share the same logic as data generator 316 and memory interface 320 can share the same logic as memory interface 314. A difference between transmit mode 310 and receive mode 308 is the direction in which data is transmitted between memory 302 and functional block 306. It may be beneficial to separate the logic of both modes to increase throughput of read and writes operations if, for example, DMA engine 304 is constrained by memory interfaces 314 or 320. Regardless, transmit mode 310 can also receive commands from functional block 306 to transmit data from memory 302 to functional block 306. It should be apparent from the disclosure that in such an operation, wherein a command to populate data by DMA engine 304 is received by functional block 306 and the corresponding data pattern is generated by data generator 322 of DMA engine 304, the interface 330 between memory 302 and DMA engine 304 may not need be used. However, such an operation can be beneficial in, for example, the networking device 200 of FIG. 2. As one example, functional block 306 may be statistics block 208. Statistics block 208 may not have complex logical functions/processing cores. Statistics block 208 can be hardcoded or otherwise configured to transmit a specific command to DMA engine 304 such as upon power up. Alternatively, functional block 306 may be an intermediary and serve as an interface to an associated processing entity of DMA engine 304.

Figure 4:
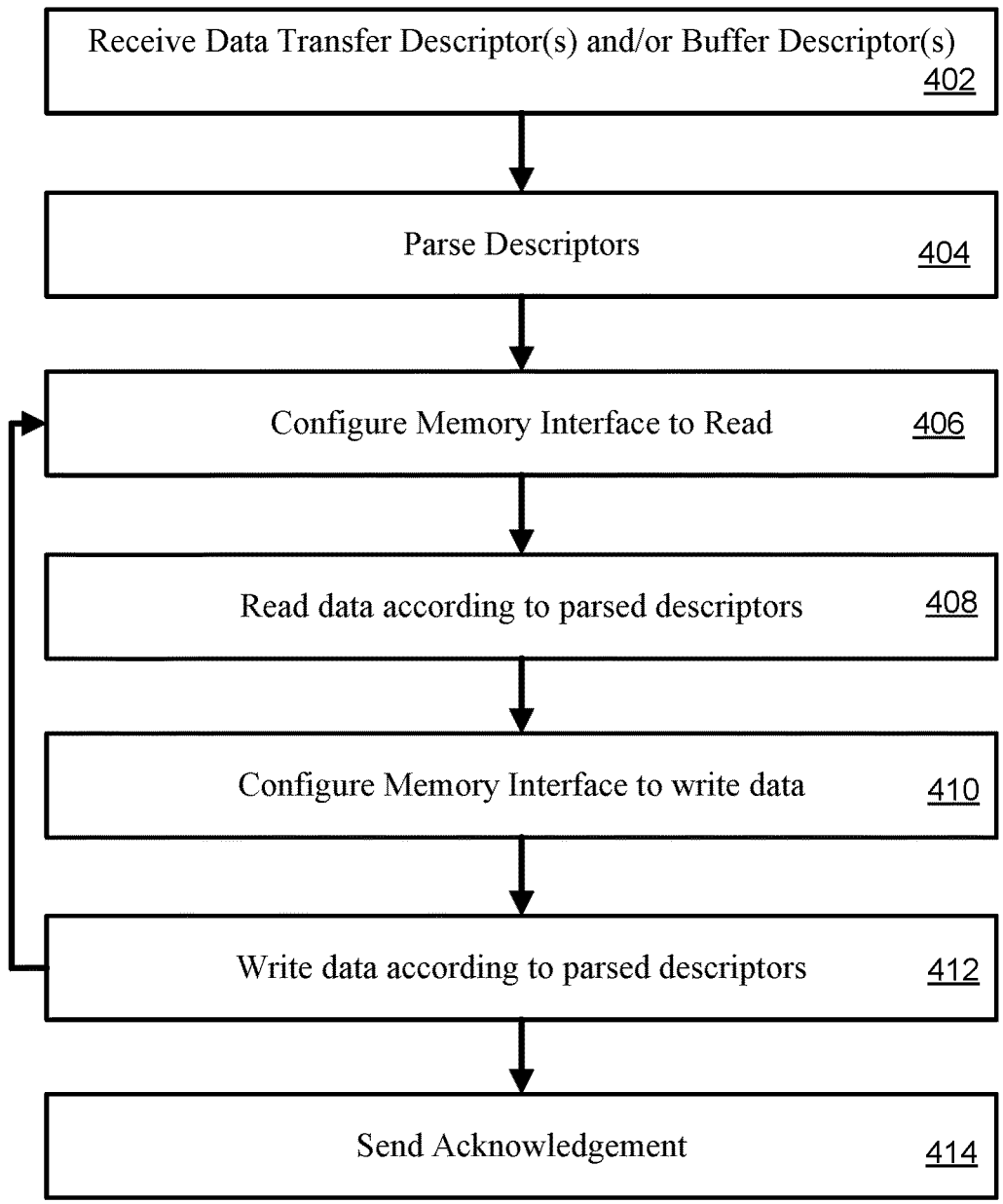
FIG. 4 illustrates a flowchart of a method of operation of a DMA engine.

FIG. 4 illustrates a method 400 of operation of a DMA engine without the benefit of a data generation module. Method 400 begins by receiving a data transfer descriptor(s) and/or buffer descriptor(s) 402. The data transfer descriptor can comprise several metadata fields. For example, one such field can be an operational code that instructs a DMA engine to perform a certain function. One such function can be transmit function while another function can be a receive function. Additionally, the data transfer descriptor can comprise a metadata field that provides a DMA engine with memory address(es) to be written to or read from. Additionally, the data transfer descriptor can contain data length or other information that may or may not be specific to a certain implementation of the DMA engine. The buffer descriptors can contain the actual data to be transferred by the DMA engine. Traditionally, without such buffer descriptors, the DMA engine may not be able to transfer data since it lacks the ability to generate any data. In other words, the DMA engine may be a relatively passive device that relies upon an associated logic device to provide the data to be transferred by the DMA engine. The buffer descriptors can comprise metadata fields including memory addresses, pointers, data to be transferred, or other such information.

The DMA engine can parse the descriptors 404 to separate, extract, and/or interpret the metadata fields contained within the data transfer descriptors or the buffer descriptors. This parsing can be performed by parser 318 or parser 324 of FIG. 3, for example. At step 406, the DMA engine can configure a memory interface to read data from a memory address (e.g., system memory, registers, cache, etc.). The memory interface can be the memory interface 314 or the memory interface 320 of FIG. 3. The configuration of a memory interface can include a memory address parsed from a data transfer descriptor, for example, and/or length information that can also be parsed from a data transfer descriptor. The configuration of the memory interface 406 can also include configuration of memory internal to the DMA engine to store data read from the memory interface.

With the memory interface configured, the DMA engine can read data in accordance with information parsed from the various descriptors. Reading the data can include transferring data using one or more data buses that can be internal to an integrated circuit or connect two or more integrated circuits together. Depending upon the commands parsed from the descriptors, the DMA engine may configure memory interface to write data 410. For example, memory of the DMA engine may be insufficient to store the totality of data requested by data transfer descriptor. In such a case, a singular data transfer descriptor request may be associated with a plurality of read and write operations by the DMA engine to fulfill the request requested by the data transfer descriptor. As shown in FIG. 4, the configuration of memory interface to write data 410 may occur in a loop to account for such eventualities. With the memory interface configured to write data 410, DMA engine can proceed to write data 412 to memory. The transfer may be accomplished through interfaces internal or external to an integrated circuit. The memory may be internal or external to an integrated circuit or functional block of an integrated circuit. As explained herein, after writing the data according to the data fields from the parsed descriptors 412, the DMA engine may proceed to configure the memory interface to read data. It should be understood, however, that a singular DMA engine may have multiple memory interfaces that can operate in parallel or otherwise. In such an instance, a reconfiguration of the memory interfaces may not be necessary, except to account for changes in memory addresses or other eventualities. At the completion of a specific data transfer request associated with one or more data transfer descriptors, the DMA engine can send an acknowledgment 414 indicating to the requesting entity that the data transfer request has been completed.

Figure 5:
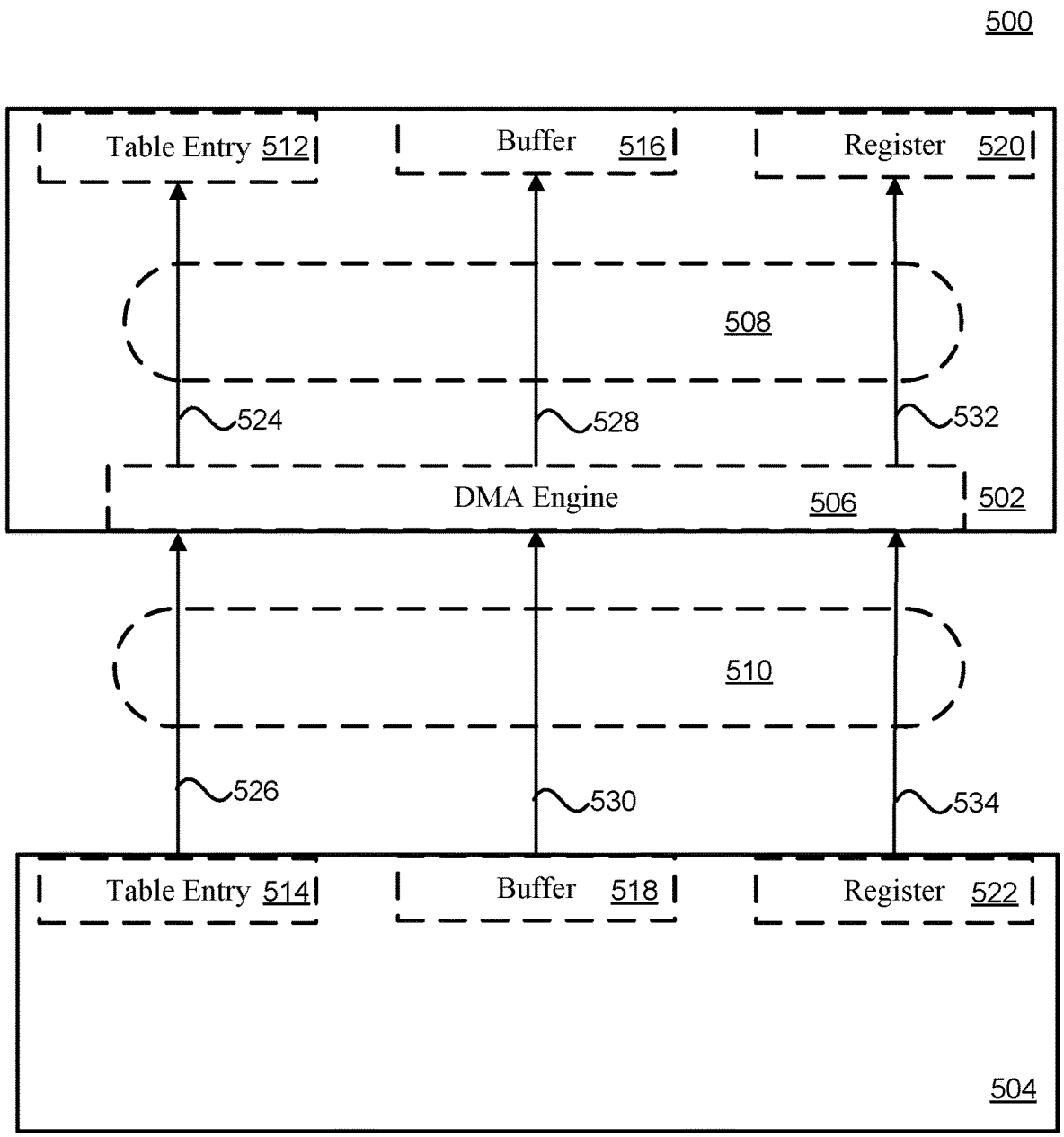
FIG. 5 illustrates a visual representation of DMA operations of the flowchart of FIG. 4.

FIG. 5 is provided to illustrate a system 500 implemented in the method 400 of FIG. 4. The system 500 includes a first device 502 and a second device 504. First device 502 is illustrated as including a DMA engine 506. Either of devices 502 or 504 can include processing logic that may be associated with DMA engine 506. Alternatively, either of devices 502 or 504 can include memory that provides DMA engine 506 with data transfer requests. As one example, device 502 can be Switch ASIC 202 and device 504 can be coprocessor 204 or vice versa. Interface 508 of first device 502 can be an internal data bus (such as a ring bus, a common bus, or other) and can be used to facilitate data transfers between DMA engine 506 and table entry 512, buffer 516, and/or register 520. Table entry 512, buffer 516, and/or register 520 can be implemented within memory of first device 502. As one example, device 502 can be Switch ASIC 102 of FIG. 1 or Switch ASIC 202 of FIG. 2. Additionally, table entry 512, buffer 516, and/or register 520 can be associated with network or other operations as described herein. It should be understood that although only three table entries are illustrated, first device 502 can contain many such table entries on the order of thousands, millions, or more.

Second device 504 can comprise table entry 514, buffer 518, and/or register 522. Table entry 514, buffer 518, and/or register 522 can be stored within memory of second device 504. Second device 504 can be coprocessor 104 of FIG. 1 or coprocessor 204 of FIG. 2, for example. Interface 510 can be used to allow data to be transferred between first device 502 and second device 504. Interface 510 can be interface 122 of FIG. 1 or interconnect 222 of FIG. 2, for example. Data transfers 524, 526, 528, 530, 532, and 534 illustrate steps 408 through 414 of FIG. 4. That is to say, each transfer between a buffer and an associated table entry can be accomplished sequentially. DMA engine 506, upon receipt of a data transfer request, can read data 526 from table entry 514 via interface 510. This data can be stored internally in a buffer of DMA engine 506. DMA engine 506 can write 524 the data read from table entry 514 to table entry 512.

DMA engine 506 can proceed in similar fashion to transfer data from buffer 518 to buffer 516 and from buffer entry 522 to register 520. Alternatively, DMA engine 506 can transfer data to the table entry 512, buffer 516, and/or register 520 from a singular buffer. Additionally, DMA engine 506 can transfer data from a plurality of buffers into a singular table entry. However, in all such instances, interface 510 becomes loaded by data transfers 526, 530, and 534. Additionally, memory of second device 504 becomes occupied by buffers 514, 518, and 522.

Buffers 518 or 522 can be mapped to an external device, directly or otherwise. For example, a buffer 516 can be mapped to external memory and the external memory can be initialized using DMA engine 506. Alternatively, table entry 514, buffer 518, and/or register 522 can be mapped to DMA engine 506 such that populating any table entry 514, buffer 518, and/or register 522 can initialize a DMA memory transfer.

Figure 6:
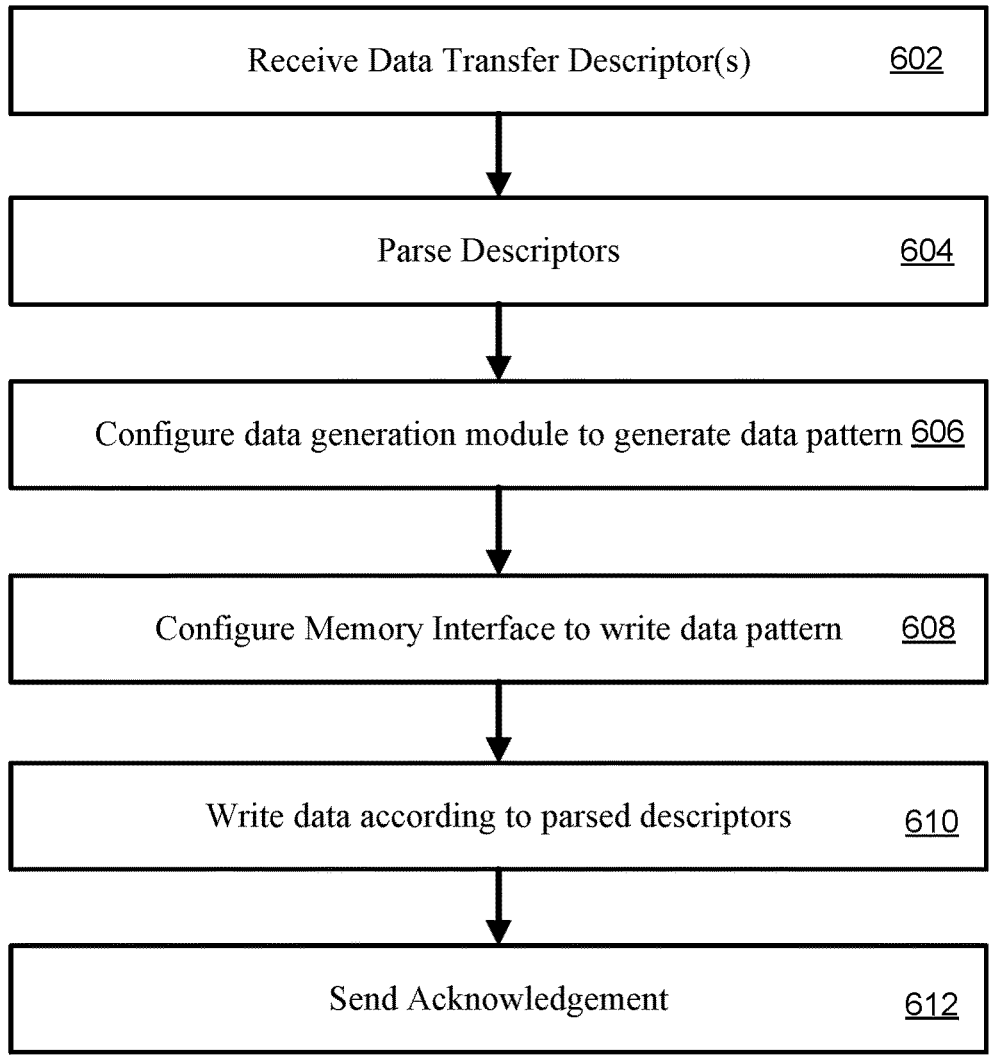
FIG. 6 illustrates a flowchart of a method of operation of a DMA engine including features of the disclosure.

FIG. 6 illustrates a method 600 of operating a DMA engine according to methods and apparatuses disclosed herein. Method 600 can be contrasted to the method 400 of FIG. 4 in order to better appreciate some of the exemplary benefits of the disclosed techniques. Method 600 begins with the step of receiving data transfer descriptors 602. The reception of data transfer descriptors 602 is similar to the reception of data transfer descriptors 402 of method 400. However, the content of data transfer descriptors received 602 by method 600 is different from method 400, as will be appreciated from the disclosure. The data transfer descriptors can be parsed 604 to obtain metadata contained therein. The metadata of data transfer descriptors can contain fields including operational codes that command the DMA engine to generate data. The generation of the data can be accomplished, for example, by data generator 316 or data generator 322 of FIG. 3. Note that method 600 lacks the reception of buffer descriptor(s) 404 of FIG. 400. Because a DMA engine using method 600 can generate its own data, it need not be provided data for certain memory transfer requests. If metadata parsed from the receipt of data transfer descriptor includes a command for the DMA engine to generate data, the DMA engine can proceed to configure a data generation module to generate a data pattern 606.

Various schemas can be used for the generation of the data pattern. For example, the metadata parsed from a data transfer descriptor can indicate a specific data pattern to be generated. Alternatively, metadata of the data transfer descriptors (or other received descriptors) can provide a seed value to the DMA engine. This seed value can be used to further generate additional data patterns using a data generation module. One simple example includes the repetition of a seed value to obtain a larger data set for transfer. A DMA engine can also include various algorithms for the modification of a seed value. A seed value can also be used in conjunction with other data points. For example, a seed value can be used in association with an internal clock of a DMA engine or an external clock in order to randomize values of a data pattern. As yet another alternative, a DMA engine can include an internal lookup table with values associated with metadata received via descriptors. In this manner, a DMA engine can be semi-customized to provide multiple data patterns selected via descriptors. Although data transfer descriptors are described herein, it should be understood that a DMA engine can also receive one or more buffer descriptors including a seed value or operational code to command the DMA engine to generate a data pattern.

DMA engine can configure a memory interface to write the data pattern 608 generated by the data generation module. The DMA engine can then write the data pattern according to the metadata parsed from the data transfer descriptors 610. For example, the parsed data can include the address and/or length of address space to be written to. If a command is associated with the generation of a data pattern larger than can be contained in a singular addresses, the DMA engine can automatically write data to subsequent or additional memory locations, even if only a single command is parsed or received. Alternatively, the command may not include an address. For example, the command may instruct the DMA engine to write to one or more addresses associated with the command. Upon completion of the data transfer, DMA engine can send an acknowledgment 612. The acknowledgment can indicate the successful or unsuccessful completion of the memory transfer request associated with the data transfer descriptors received at 602.

Figure 7:
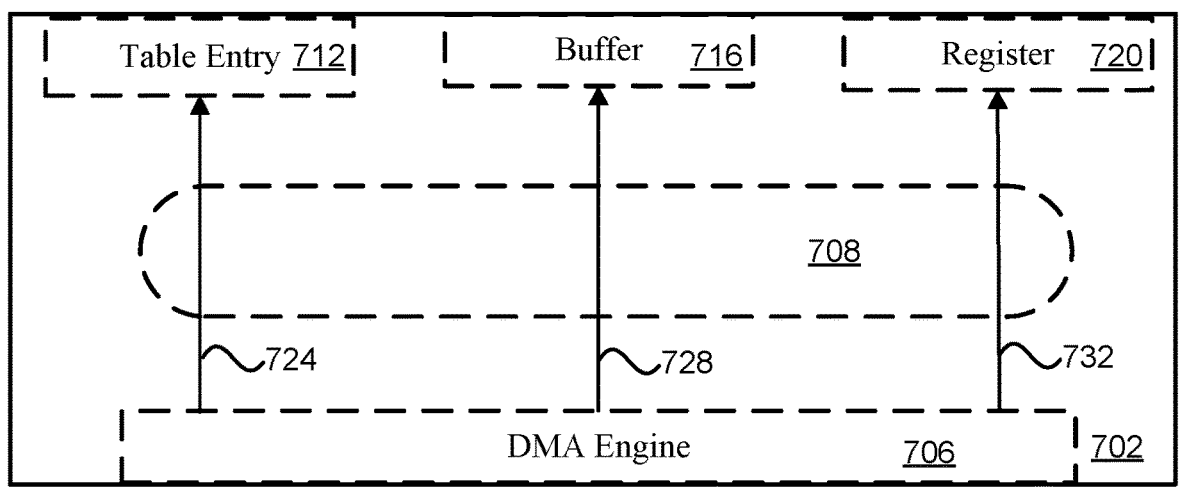
FIG. 7 illustrates a visual representation of DMA operations of the flowchart of FIG. 6.
Figure 7:

FIG. 7 illustrates an implementation of the method 600 in order to accentuate advantages of the use of method 600 over the use of method 400. In FIG. 7, a system 700 is illustrated. System 700 is similar to system 500. However, DMA engine 706 is able to implement techniques disclosed herein and can include a data generation module. System 700 includes a first device 702 that can be equated to first device 502 and a second device 704 that can be equated to second device 504. Likewise, interfaces 708 and 710 can be equated to interfaces 508 and 510.

System of 700 is illustrated as performing a memory transfer request similar to the memory transfer request illustrated by FIG. 5. More specifically, system 700 is illustrated as populating table entry 712, buffer 716, and/or register 720 that can be equated to table entry 512, buffer 516, and/or register 520. It is assumed that DMA engine 706 has received a work descriptor commanding DMA engine 706 to populate table entry 712, buffer 716, and/or register 720 by internally generating data patterns to populate the table entries. Unlike DMA engine 506 of FIG. 5, DMA engine 706 of FIG. 7 can populate table entry 712, buffer 716, and/or register 720 without the use of a buffer within second device 704. Additionally, as no data need be transferred from second device 704 to populate table entry 712, buffer 716, and/or register 720, interface 710 need not be burdened by the transfer of such data. Furthermore, as second device 704 need not contain buffers, memory of second device 704 is not populated by this data is free for other uses. Additionally, processing logic (not shown) is free from the burden of generating the data to populate the data buffers. It should be understood that relieving the processing entities, buffers, memory, interconnects, and interfaces using the techniques disclosed herein can reduce power consumption required for the illustrated example operations of populating various memory devices. Additionally, time required to perform memory initialization or populating memory can be reduced by decreasing the number of transactions needed to perform such an operation. Time can also be reduced for an operation by alleviating transfer of data from certain interfaces that may have relatively long latencies. For example, interface 710 can be between two separate integrated circuits whereas interface 708 may be internal to an integrated circuit.

Some or all of the method 400 or method 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 8:
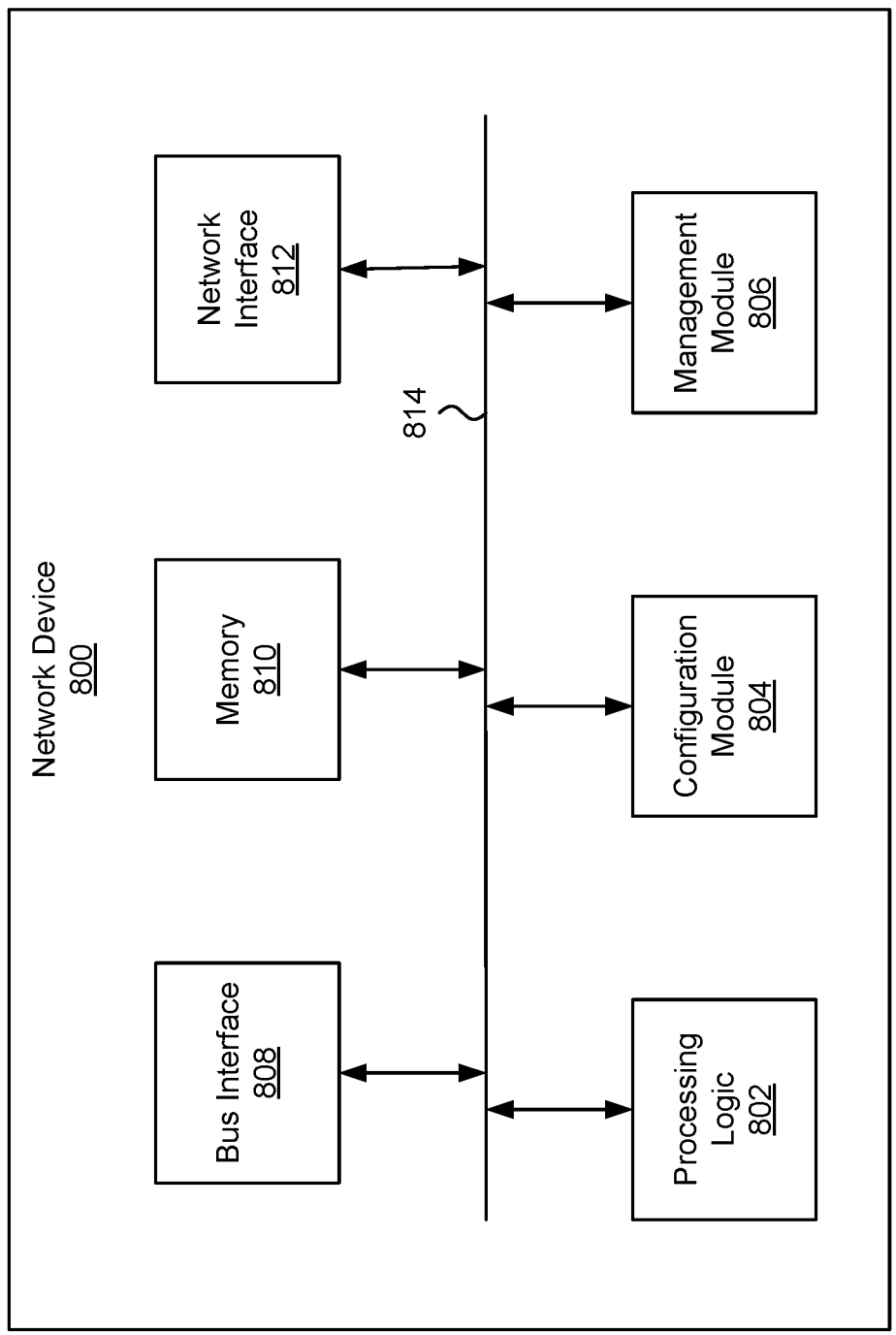
FIG. 8 illustrates aspects of an example environment of a network device for implementing aspects in accordance with some embodiments.

FIG. 8 illustrates an example of a network device 800. Functionality and/or several components of the network device 800 may be used without limitation with other embodiments disclosed elsewhere in this disclosure, without limitations. A network device 800 may facilitate processing of packets and/or forwarding of packets from the network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 800 may be the recipient and/or generator of packets. In some implementations, the network device 800 may modify the contents of the packet before forwarding the packet to another device. The network device 800 may be a peripheral device coupled to another computer device, a switch, a router or any other suitable device enabled for receiving and forwarding packets.

In one example, the network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The network device 800 may include additional modules, not illustrated here, such as components discussed with respect to the nodes disclosed in FIG. 9. In some implementations, the network device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the network device 800, while in other cases some or all of the memory may be external to the network device 800. The memory 810 may store an operating system comprising executable instructions that, when executed by the processing logic 802, provides the execution environment for executing instructions providing networking functionality for the network device 800. The memory may also store and maintain several data structures and routing tables for facilitating the functionality of the network device 800.

In some implementations, the configuration module 804 may include one or more configuration registers. Configuration registers may control the operations of the network device 800. In some implementations, one or more bits in the configuration register can represent certain capabilities of the network device 800. Configuration registers may be programmed by instructions executing in the processing logic 802, and/or by an external entity, such as a host device, an operating system executing on a host device, and/or a remote device. The configuration module 804 may further include hardware and/or software that control the operations of the network device 800.

In some implementations, the management module 806 may be configured to manage different components of the network device 800. In some cases, the management module 806 may configure one or more bits in one or more configuration registers at power up, to enable or disable certain capabilities of the network device 800. In certain implementations, the management module 804 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the network device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 800 may include multiple network interface modules, each configured to communicate with a different network. For example, in these implementations, the network device 800 may include a network interface module for communicating with a wired Ethernet network, a wireless 802.11 network, a cellular network, an Infiniband network, etc.

The various components and modules of the network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
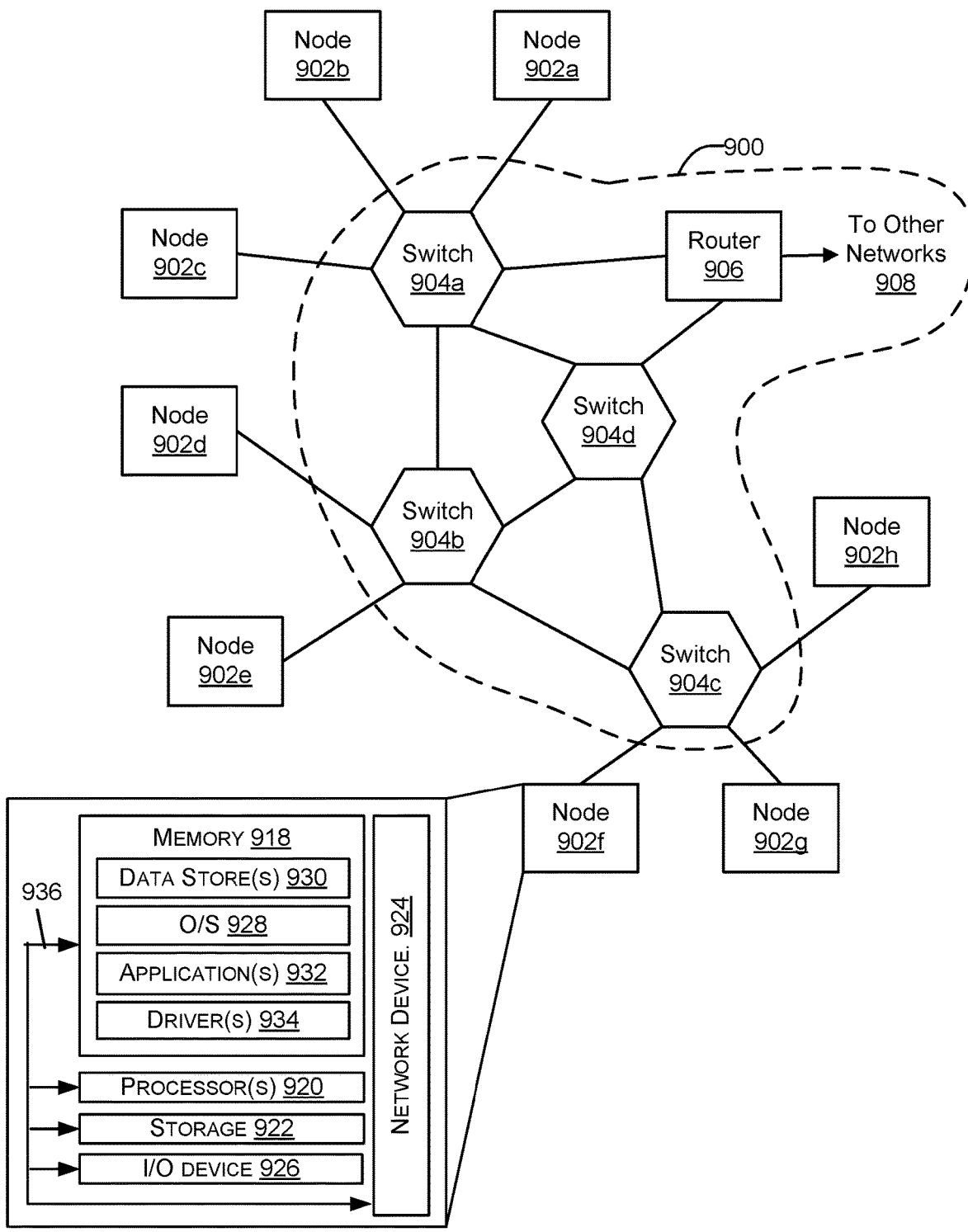
FIG. 9 illustrates an example architecture for features and systems described herein that includes one or more service provider computers and/or a user device connected via one or more networks, according to some embodiments.

FIG. 9 illustrates a network 900, illustrating various different types of network devices 800 of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 926 that allow the node(s) 902a-902h to communicate with a stored database, another computing device or server, user terminals and/or other devices on the network(s) 900. The network device(s) 924 of FIG. 9 may include similar components discussed with reference to the network device 800 of FIG. 8.

In some implementations, the network device 926 is a peripheral device, such as a PCI-based device. In these implementations, the network device 926 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 926 may be connected to a computing system using a PCIe interface.

A PCI-based device may include one or more functions. A "function" describes operations that may be provided by the network device 926. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 926 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus comprising a Direct Memory Access (DMA) engine, the DMA engine comprising:
   a parsing module;
   a data generation module; and
   a memory interface module;

wherein the parsing module is configured to:
  receive a first data transfer descriptor;
  parse, from metadata of the first data transfer descriptor, a first command from a processing entity to obtain a first memory address;
  configure, based on the first command, the data generation module to generate a data pattern;
  configure, based on the first command, the memory interface module to write the data pattern to multiple memory addresses including the first memory address to initialize the multiple memory addresses;
  receive a second data transfer descriptor;
  parse, from metadata of the second data transfer descriptor, a second command from the processing entity to obtain the first memory address and a second memory address; and
  configure, based on the second command, the memory interface module to read second data from the second memory address and overwrite the data pattern at the initialized first memory address with the second data.

2. The apparatus of claim 1, wherein the first command is further associated with a data length and the parsing module is further configured to parse the first command to obtain the data length and configure the data generation module to generate the data pattern corresponding to the data length.

3. The apparatus of claim 1, wherein the first command is further associated with a seed data pattern and the parsing module is further configured to parse the first command to obtain the seed data pattern and configure the data generation module to generate the data pattern based on the seed data pattern, the data pattern being different from the seed data pattern.

4. The apparatus of claim 3, wherein the data generation module is further configured to generate the data pattern that includes a repetition of the seed data pattern.

5. The apparatus of claim 1, wherein the first memory address is associated with Error Correcting Code (ECC) memory including ECC code generation functionality.

6. An apparatus comprising a Direct Memory Access (DMA) engine, the DMA engine being configured to:
  receive a first data transfer descriptor;
  parse, from the first data transfer descriptor, a single one of a particular type of write command from a processing entity with an indicator to write a data pattern to multiple addresses to initialize the multiple addresses;
  upon parsing the single one of the particular type of write command, generate, using a data generation module of the DMA engine and based on the indicator, the data pattern;
  write the data pattern to the multiple addresses to initialize the multiple addresses;
  receive a second data transfer descriptor;
  parse, from the second data transfer descriptor, at least one of: a second write command from the processing entity to write second data to at least some of the initialized multiple addresses, or a read command from the processing entity to read at least some of the initialized multiple addresses; and
  perform at least one of: writing the second data to the at least some of the initialized multiple addresses, or reading the data pattern from the at least some of the initialized multiple addresses, based on at the at least one of the second write command or the read command.

7. The apparatus of claim 6, wherein the processing entity is a Central Processing Unit (CPU).

8. The apparatus of claim 7, further comprising a parsing module configured to parse the particular type of write command to obtain the multiple addresses and the indicator of the data pattern.

9. The apparatus of claim 6, wherein the DMA engine is disposed on one integrated circuit die and the processing entity is disposed on a separate integrated circuit die.

10. The apparatus of claim 6, wherein the DMA engine is disposed within a network device including a network lookup table and the DMA engine is configured to write the data pattern to the network lookup table.

11. The apparatus of claim 6, further configured to read a plurality of commands, wherein commands of the plurality of commands direct the DMA engine to perform a plurality of memory transfer functions, a first memory transfer not using the data generation module to generate the data pattern and a second memory transfer using the data generation module to generate the data pattern.

12. The apparatus of claim 11, further configured to read commands from the plurality of commands autonomously without being directed by the processing entity to read each command of the plurality of commands.

13. A computer implemented method, comprising:
  receiving, by a Direct Memory Access (DMA) engine, a first data transfer descriptor;
  parsing, using a parsing module of the DMA engine, a single one of a particular type of write command from a processing entity with an indicator to write a data pattern to multiple addresses to initialize the multiple addresses;
  upon parsing the single one of the particular type of write command, generating, using a data generation module of the DMA engine and based on the indicator, the data pattern;
  writing, by the DMA engine, the data pattern to the multiple addresses to initialize multiple addresses;
  receiving, by the DMA engine, a second data transfer descriptor;
  parsing, using the parsing module of the DMA engine, at least one of: a second write command from the processing entity to write second data to at least some of the initialized multiple addresses, or a read command from the processing entity to read at least some of the initialized multiple addresses; and
  performing, by the DMA engine, at least one of: writing the second data to the at least some of the initialized multiple addresses, or reading the data pattern from the at least some of the initialized multiple addresses, based on at the at least one of the second write command or the read command.

14. The method of claim 13, wherein an address of the multiple addresses is associated with a register.

15. The method of claim 13, wherein an address of the multiple addresses is associated with a lookup table entry.

16. The method of claim 13, wherein an address of the multiple addresses is associated with a memory buffer.

17. The method of claim 13, wherein the data pattern is a pattern consisting of all zero bits.

18. The method of claim 13, further comprising receiving a seed pattern from the processing entity and generating the data pattern using the seed pattern, the data pattern including more bits than the seed pattern.

19. The method of claim 13, further comprising:
  receiving, by the DMA engine, a third data descriptor;
  extracting, by the DMA engine and from metadata of the third data descriptor, an alternative particular type of write command; and upon parsing the alternative particular type of write command, generating, using the data generation module of the DMA engine, an alternative data pattern to be written to the multiple addresses, the alternative data pattern being different from the data pattern.

20. The apparatus of claim 1, wherein the data pattern is not generated based on the second data read from the first memory address.

21. The apparatus of claim 6, wherein the indicator of the particular type of write command specifies the data pattern to be written to the multiple addresses.

22. The method of claim 13, wherein the indicator of the particular type of write command specifies the data pattern to be written to the multiple addresses.

23. The apparatus of claim 1, wherein the first data transfer descriptor and the second data transfer descriptor are stored in a memory by the processing entity and are received by the DMA engine from the memory.

24. The apparatus of claim 1, wherein the metadata specifies a length of an address space including the multiple memory addresses.

25. The apparatus of claim 1, wherein the parsing module is configured to configure the memory interface module to write the data pattern to the multiple memory addresses with the first memory address as a starting address based on a size of the data pattern being larger than that can be contained in the first memory address.

* * * * *